INVENTORS
THIJS de HAAS &
WATSON F. WALKER
BY
Martin LuKacher
ATTORNEY

INVENTORS
THIJS de HAAS &
WATSON F. WALKER
BY [signature]
ATTORNEY

INVENTORS
THIJS de HAAS &
WATSON F. WALKER
BY
ATTORNEY

United States Patent Office 3,430,143
Patented Feb. 25, 1969

3,430,143

COMMUNICATIONS SYSTEM WHEREIN INFORMATION IS REPRESENTED BY THE PHASE DIFFERENCE BETWEEN ADJACENT TONES

Watson F. Walker, Pittsford, and Thijs de Haas, Rochester, N.Y., assignors to General Dynamics Corporation, a corporation of Delaware Filed Mar. 15, 1965, Ser. No. 439,594
U.S. Cl. 325—30 14 Claims
Int. Cl. H03k *9/06;* H04b *7/00;* H04l *27/18*

ABSTRACT OF THE DISCLOSURE

A system for communicating digital information is described. Two bits of information are represented by the difference in phase between two adjacent tones in a group of tones. Since two bits offer four possible combinations, four phase differences in 90° increments are used. The phase differences are coded into four positions 45°, 135°, 225° and 315° corresponding to 00, 01, 11 and 10 respectively. The phase shifted signals are transmitted during a symbol interval and the signal is detected during the symbol interval synchronized with the symbol interval during which the data is transmitted. The detection takes place at the receiving point where a pair of correlators operates on each transmitted tone and the correlator outputs are compared with each other to derive outputs representing the phase difference between adjacent tones. These outputs are decoded into the digital information which is transmitted by the group of tones during the symbol interval.

The present invention relates to communications systems, and particularly to a system for the communication of digital information.

The invention is especially suitable for use in frequency differential phase shift keying communications systems of the type described in U.S. Patent No. 3,036,157 which issued on May 22, 1962, to G. A. Franco and G. Lachs. In such systems one or more unmodulated reference tones are transmitted along with phase-keyed information tones which are closely located in frequency. The information is contained in the difference in phase between the information and reference tones. Since the reference and information tones are subject to the same perturbations during transmission, phase fluctuations resulting from fading and multipath effects do not seriously deteriorate the performance of the system. When a large amount of information is to be handled, many unmodulated reference tones are transmitted interlaced with the information tones. It is desirable to reduce the number of such reference tones without affecting the performance of the system, thereby increasing the information handling capacity of the system.

Accordingly, it is an object of the present invention to provide improved communications systems.

It is another object of the present invention to provide an improved communications system of the frequency differential phase shift keying type.

It is another object of the invention to provide an improved communications system adapted for transmitting large quantities of digital data over high frequency radio data links, which may be subject to fading and multipath effects, in which spectrum utilization is enhanced without compromising error performance.

It is a further object of the present invention to provide an improved frequency differential phase shift keying communications system which requires fewer reference tones for the transmission of larger quantities of data than previous systems of this type.

It is a still further object of the invention to provide an improved frequency differential phase shift keying system which may be constructed in large part of digital circuitry and is adaptable to use integrated circuit techniques.

It is a still further object of the invention to provide an improved circuit for obtaining the product of two functions which are representable by electrical signals.

Briefly described a system embodying the invention includes a modulator which progressively modulates a plurality of tones so that the information is represented by the phase difference between tones which are adjacent to each other in frequency, such phase difference being measurable by the phase angle of the difference frequencies of such tones with respect to a given time base. In other words, the successive tones, even though modulated, provide phase references for each other thus providing large data handling capacity for a given number of tones. The system includes a demodulator in which the tones, on reception, are compared with each other in successive pairs to provide outputs representing the phase differences therebetween. The information is derived by converter circuits responsive to these outputs.

The invention itself, both as to its organization and method of operation, as well as additional objects and advantages thereof will become more readily apparent from a reading of the following description in connection with the accompanying drawings in which.

Figure 1:
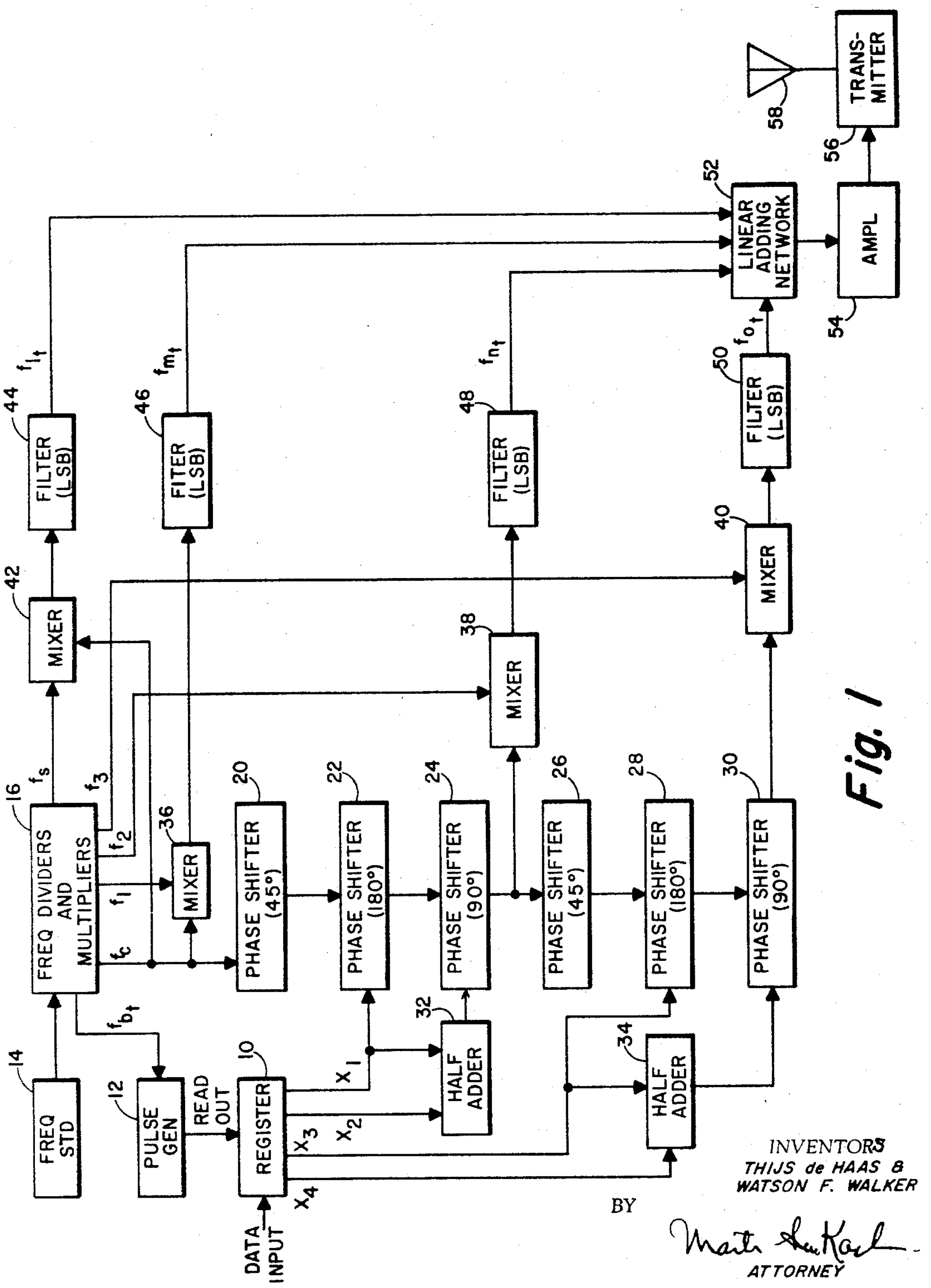
FIG. 1 is a simplified block diagram of the transmitter portion of a system embodying the invention.

Referring more particularly to FIG. 1, there is shown a register 10 in which a plurality of bits of digital data, as may arrive serially from a data input line, may be stored. Four bits which are available in parallel in the output stages of the register 10 are indicated as $x_1$, $x_2$, $x_3$ and $x_4$. The register 10 may be a shift register from which these last four bits are read out in response to a readout pulse. While only four bits are indicated, it will, of course, be appreciated that a much larger number of bits may be simultaneously transmitted by means of a system embodying the invention.

The readout pulses are generated by a pulse generator 12 which provides repetitive pulses at a given frequency the period of which is equal to the symbol interval during which a plurality of bits is transmitted. A suitable given repetition rate or frequency may be 25 c.p.s. and this frequency is indicated generally as $f_{bt}$ and is the time base of the system. This frequency is derived from a frequency sandard 14 which may be a crystal controlled oscillator of the type known in the art. The output of this standard is applied to the frequency divider and multiplier circuits 16 which may include tandem connected flip-flop circuits as well as non-linear multiplier circuits of the type known in the art. In addition to the signal of frequency, $f_{bt}$, the circuits 16 provide signals of other frequencies $f_c$, $f_1$, $f_2$, $f_3$ and $f_s$. $f_c$ may be a frequency which is a few orders of magnitude higher than $f_{bt}$. It is desirable to provide a frequency which is a multiple of the frequency $f_{bt}$ since that frequency can be more conveniently provided by means of the circuit 16. Accordingly, $f_c$ may be equal to $mf_{bt}$, where $m$ is an integer. A suitable frequency for $f_c$ is 1000 c.p.s. which is the fortieth harmonic of $f_{bt}$, where $f_{bt}$ is 25 c.p.s.

$f_s$ may be a frequency which may be chosen so as to provide output signals in a frequency range suitable for application to the input of a radio transmitter or other equipments as may be applicable, as will be described hereinafter. This frequency $f_s$ may generally be equal to $n$ $f_{bt}$. The remaining signals of frequencies $f_1$, $f_2$ and $f_3$ are equally spaced from each other by a frequency equal to $f_{bt}$. Accordingly:

$$f_1=f_s+f_{bt}$$
$$f_2=f_s+2f_{bt}$$
$$f_3=f_s+3f_{bt}$$

Since all of the frequencies involved are related to $f_{bt}$, a discrete number of cycles or half cycles thereof can occur in the symbol interval, which is equal to the period of $f_{bt}$. This condition improves correlation detection as is accomplished in the receiver portion of the system to be described hereinafter.

The information is transmitted on the basis of quadrinary phase-shift keying by means of the plurality of phase shifters 20, 22, 24, 26, 28 and 30, which are connected in tandem and through which the signals of frequency $f_c$ passes and is progressively phase shifted. The phase-shift keyers 20 and 26 may be resistor-capacitor networks which provide a phase shift of 45° (Π/4 radians). The phase shifters 22 and 28 may be amplifiers having one stage which preferably provides zero gain, and which may be electronically switched into and out of the circuit, respectively when the bit applied thereto is a binary "1" and a binary "0" bit. Accordingly, the amplifiers constitute phase shifters which provide a 180° (Π radians) phase shift in response to a binary "1" bit and no phase shift in response to a binary "0" bit. The phase shifters 24 and 30 may similarly be amplifier circuits containing stages including resistor capacitor networks which provide 90° (Π/2) phase shifts, when these stages are switched into the circuits. Accordingly, a phase shift of 90° may be presented in response to a binary "1" bit by electronically connecting the amplifier stage into the circuit in response to that bit; the stage being disconnected electronically in response to a binary "0" bit. Digital signal operated electronic switches for connecting and disconnecting one of a plurality of amplifier stages are well known in the art and therefore are not described in detail herein. Of course, other types of digitally operated phase shifter circuits such as may be included in the multiplier circuits 16 may be used. For example, $f_c$ may be generated in all its eight possible phases, and gates provided to select the desired phases in accordance with the date to be transmitted.

The $x_1$ and $x_3$ bits control the 180° phase shifters 22 and 28 respectively. The 90° phase shifters 24 and 30 are controlled by the output of modulo two adding circuits such as the half-adders 32 and 34 respectively. The half-adder 32 provides the modulo two sum of the $x_1$ and $x_2$ bits, while the half-adder 34 provides the modulo two sum of the $x_3$ and $x_4$ bits.

Figure 2:
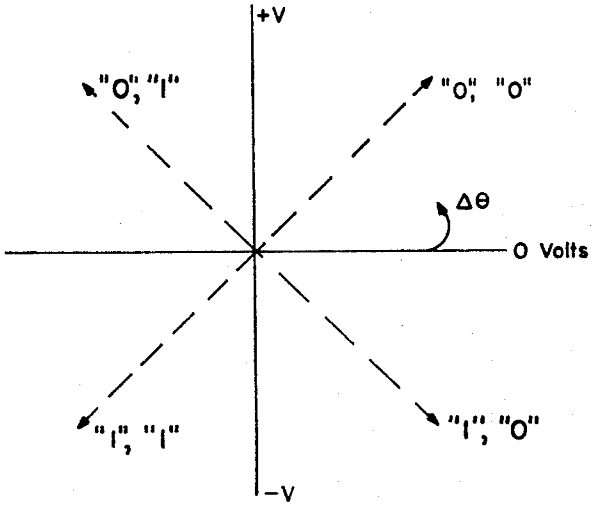
FIG. 2 is a diagram showing the phase coding of digital information in the system of FIG. 1.

The phase difference between tones adjacent to each other in frequency is used as the information quantity for two bits. This phase difference may be represented as $\Delta\theta_k$. This angle is coded into any one of four phase positions; namely 45°, 135°, 225° and 315° (Π/4, 3Π/4, 5Π/4, and 7Π/4) corresponding to the respective values of adjacent bits of "0" "0", "0" "1", "1" "1" and "1" "0". FIG. 2 graphically represents the above described phase coding relationship.

It follows from the foregoing description and from FIG. 2 that the absolute phase of the signal at the output of the phase shifter 30 may be represented by the following equation:

$$\theta_k=\left[\theta_{k-1}+\frac{\Pi}{4}+(x_4\oplus x_3)\frac{\Pi}{2}+x_3\Pi\right]$$

and the phase angle of the signal emanating from the phase shifter 24 may be represented by the following equation:

$$\theta_{k-1}=\left[\frac{\Pi}{4}+(x_2\oplus x_1)\frac{\Pi}{2}+x_1\Pi\right]$$

It will be appreciated that through the use of additional groups of phase shifters such as would include 45°, 180° and 90° phase shifters similar to phase shifters 26, 28 and 30, additional pairs of bits may be simultaneously coded and transmitted simultaneously with the bits $x_1$ through $x_4$ during each symbol interval.

Mixers 36, 38, 40 and 42 are provided for heterodyning the signals of frequency $f_c$ at the input to the tandem phase shifters 20 through 30 and at the outputs of each group of phase shifters (viz, at the output of phase shifter 24 and phase shifter 30) into signals of frequencies which are separated by the frequency $f_{bt}$. The lower sideband outputs of these mixers 42, 36, 38 and 40 are passed by means of filters 44, 46, 48 and 50. These frequencies are indicated as $f_{1t}$, $f_{mt}$, $f_{nt}$ and $f_{nt}$. $f_{1t}$, which is used for synchronizing purposes in the receiver, as will appear hereinafter, may be a frequency equal to $f_s-f_c$. The remaining frequencies at the outputs of the filters may be represented by the following equations:

$$f_{mt}=f_{1t}+f_{bt}$$
$$f_{nt}=f_{1t}+2f_{bt}$$
$$f_{ot}=f_{1t}+3f_{bt}$$

It will be noted that these frequencies are separated by the given frequency $f_{bt}$ and will be progressively modulated in phase.

The signals $f_{1t}$, $f_{mt}$, $f_{nt}$ and $f_{ot}$ may be combined in a linear adding network 52, as may be a resistive matrix. The combined signal is then amplified in an amplifier 54 and transmitted by means of a transmitter 56 which may be a high-frequency radio transmitter which propagates the signals by way of an antenna 58 over a radio link. In the event the lower sideband products of the mixers 38 to 42 were all in a frequency range far removed from the upper sideband products, a single filter in the amplifier 54 or immediately ahead of that amplifier may be used to remove all but the lower sideband products. It will be appreciated, of course, that the upper sideband rather than the lower sideband products might be used.

Figure 3:
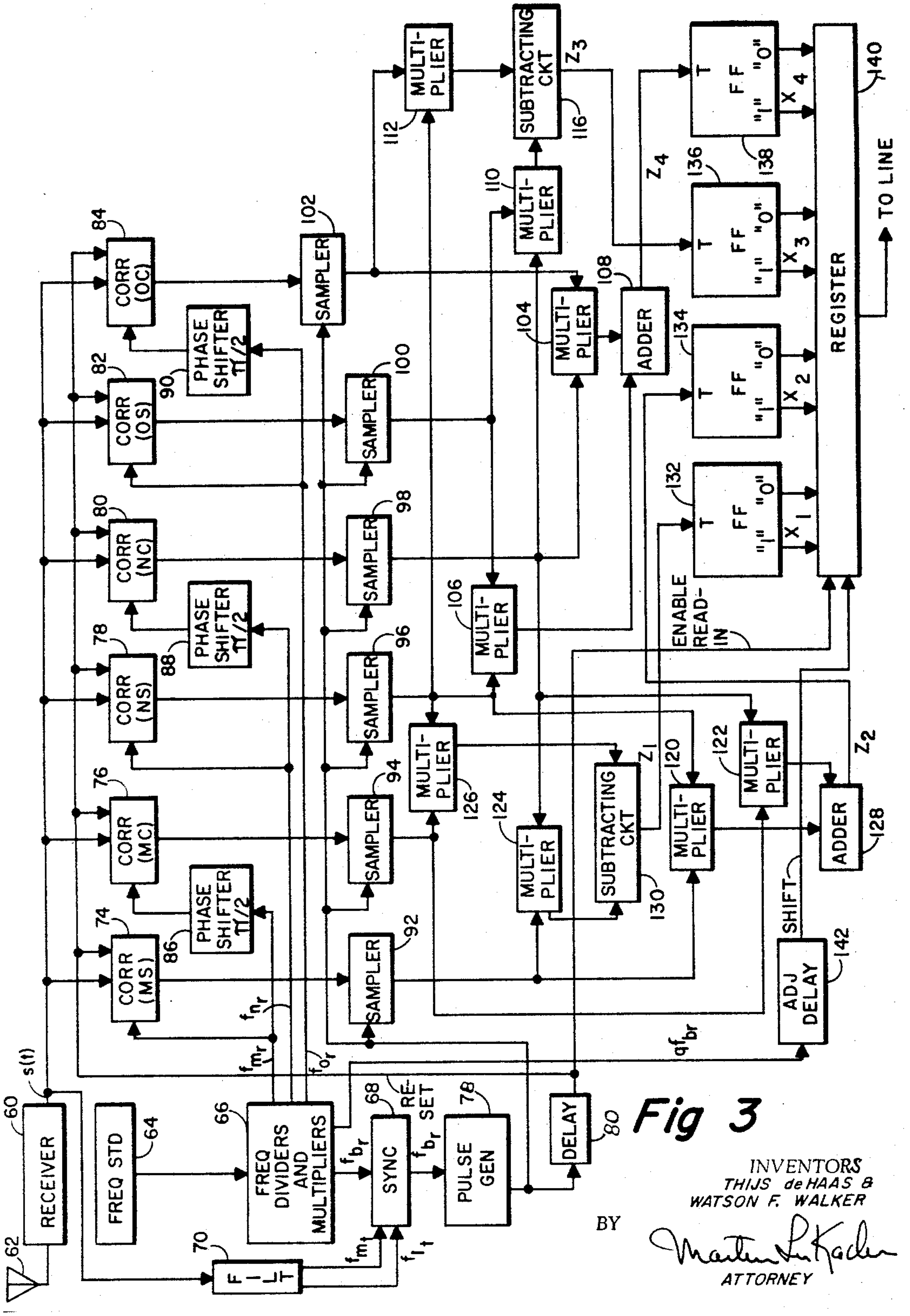
FIG. 3 is a simplified block diagram of the receiver portion of a system embodying the invention.

The receiving portion of the system is illustrated in FIG. 3. A receiver 60 derives the signals which are transmitted from the transmitter 56 (FIG. 1). The receiver 60 may be a high frequency communication receiver which is connected to an antenna 62. The total incoming signal, $s(t)$ at the output of the receiver contains all of the tones which are transmitted over the radio link; i.e. $f_{1t}$, $f_{mt}$, $f_{nt}$ and $f_{ot}$. This signal may be represented, generally during each symbol interval (i.e. $1/f_{bt}$) as $$s(t)=\Sigma_v A_v \sin(2\Pi f_v t+\Phi_v)$$

where $A_v$ is equal to the amplitude of each signal, $f_v$ is the frequency of each signal, for example the frequencies of $f_{1t}$, $f_{mt}$, $f_{nt}$, $f_{ot}$ in the illustrated case, and $\Phi_v$ is the phase angle of each of the respective signals.

A frequency standard 64 which may be similar to the frequency standard 14 (FIG. 1) provides signals to frequency divider and multiplier circuits 66, also similar to the circuits 16 in FIG. 1. A plurality of signals having the same frequencies as those generated in the frequency divider and multiplier circuits 16 are also provided by th circuit 66. These signals have frequencies of $f_{nr}$, $f_{mr}$ and $f_{or}$. Another signal which is in the form of a pulse, having a repetition rate of $qf_{br}$ is provided, as for example from the binary frequency dividers in the circuit 66. The frequency $f_{br}$ is the same as the frequency $f_{bt}$ which is generated in the transmitter portion of the system (FIG. 1). $q$ is the ratio of the rate at which data is transmitted (total number of bits per second) to the number of symbol intervals per second. Accordingly in the illustrated system $q$ is equal to four and $qf_{b_r}$ is equal to 100 c.p.s.

The frequency divider and multipliers 66 also provide the frequency $f_{b_r}$, the period of which is equal to the symbol interval. It is desirable that the symbol interval during reception (demodulation) be the same as the symbol interval during transmission (modulation). To this end a synchronizing circuit 68 is provided. This system receives the receiver-generated frequency $f_{b_r}$ as well as the transmitted frequencies, $f_{m_t}$ and $f_{1_t}$, which are extracted from the total incoming signal $s(t)$ as by means of filter circuits 70. The synchronizing circuit 68 includes mixer circuits which heterodyne the signals of frequency $f_{m_t}$ and $f_{1_t}$ with each other to provide an output signal having a frequency equal to the difference frequency therebetween. It will be recalled that the difference frequency between $f_{1_t}$ and $f_{m_t}$ is $f_{b_t}$.

A phase-locked loop, as may include a variable frequency oscillator and phase detector for controlling a frequency thereof, may also be provided in the synchronizing circuit 68. The variable frequency oscillator may normally have a frequency of $f_{b_r}$ (viz 25 c.p.s.). The output of the phase-locked loop oscillator is compared in the phase detector with the output of the mixer system in which $f_{m_t}$ and $f_{1_t}$ are heterodyned. The phase detector provides an error signal in accordance with the phase difference between $f_{b_r}$ and $f_{b_t}$. The phase-locked loop oscillator is phase locked by this error signal and accordingly provides an output frequency $f_{b_r}$ which is phased locked with $f_{b_t}$. Accordingly, the symbol interval during reception will be synchronized with the symbol interval during transmission. The output of the synchronizing system 68 is therefore a signal of frequency $f_{b_r}$ which is synchronized with the signal $f_{b_t}$.

A pulse generator 78 shapes the synchronizing circuit 68 output signal $f_{b_r}$ into a short pulse which occurs at the end of the symbol interval, for example, the pulse may terminate at the positive going, zero cross-over of the signal $f_{b_r}$. Since circuits for generating pulses at certain times during the cycle of an AC wave as may be included in the pulse generator 78 are known in the art, they will not be described in detail herein. The output of the pulse generator is also applied to a delay circuit 80 which provides a short pulse which occurs at the beginning of each symbol circuit. It may be desirable to combine the pulse generator 78 and the delay circuit 80 into a single circuit which provides a pulse, occurring during the positive going zero cross-over of the signal $f_{b_r}$. The leading edge of this pulse then will occur just before the end of the symbol interval and the trailing edge of this pulse will occur just at the beginning of the next symbol interval. Pulses generated in response to this trailing edge and this leading edge may then be used instead of the output pulse of the pulse circuit 78 and the delay circuits 80, respectively.

Among the tones which comprise the total incoming signals $s(t)$ are the phase-modulated information tones of frequencies $f_{o_t}$, $f_{n_t}$ and $f_{m_t}$. These tones may be represented by the following three equations during a symbol interval:

$$S_{o_t}=A_{o_t}\sin(2\Pi f_{o_t}t+\theta_k)$$
$$S_{n_t}=A_{n_t}\sin(2\Pi f_{n_t}t+\theta_{k-1})$$
$$S_{m_t}=A_{m_t}\sin(2\Pi f_{m_t}t+\theta_{k-2})$$

The phase angles of these signals may be shifted during propagation due, for example, to a multipath and fading. Thus, for example, the signal $S_{o_t}$ may on reception be represented by the following equation:

$$S_{o_t}=A_{o_t}\sin(2\Pi f_{o_t}+\Phi_k)$$

where $\Phi_k=\theta_k-A_k$, and $A_k$ represents the propagation phase shift during transmission between the receiving and transmitting terminals. As was explained above, the information is contained in the phase difference $\Delta\Phi$, between the received information tones which are adjacent to each other in frequency, such phase difference being defined with respect to the system time base. The phase difference between the incoming tones $S_{o_t}$ and $S_{n_t}$ may be derived from the absolute phase angles of these tones in accordance with the relationship:

$$\Delta\Phi_k=(\Phi_k-\Phi_{k-1})$$

where $\Delta\Phi_k$ is the phase difference between the tones $S_{o_t}$ $S_{n_t}$ and $\Phi_k$ $\Phi_{k-1}$ are the absolute phase angles of these tones during a symbol interval. The propagation phase shift of the signal $S_{o_t}$ is essentially equal to the propagation phase shift of the signal $S_{n_t}$ because of their close frequency spacing. Accordingly, the propagation phase shift $A_{k-1}$ associated with the signal $S_{n_t}$ is essentially equal to $A_k$. The difference angle $\Delta\Phi_k$ is therefore equal to the difference between the absolute phase angles of the tones $S_{o_t}$ and $S_{n_t}$. This relationship may be expressed methematically as:

$$\Delta\Phi_k=(\theta_k-\theta_{k-1})=\Delta\theta_k$$

Accordingly, the information may be derived from the difference angle $\Delta\Phi_k$, per se.

A plurality of correlator circuits 74, 76, 78, 80, 82 and 84 are provided for determining the phase angles of the received information tones $S_{m_t}$, $_{n_t}$ and $S_{o_t}$. The correlators 74 and 76 are designated with the legend (MS and MC) to indicate that these correlators 74 and 76 are the sine and cosine correlators associated with the $S_{m_t}$ tone. The other correlators, 78, 80 and 84 are labeled NS, NC, OS and OC to similarly indicate their effectiveness as sine and cosine correlators for the $S_{n_t}$ and $S_{o_t}$ tones. The signals of frequency $f_{m_r}$, $f_{n_r}$ and $f_{o_r}$ from the frequency divider and multiplier 66 are applied to the correlators for the tones of corresponding frequency. Phase shifters 86, 88 and 90 are provided to phase shift the tones from the frequency dividers and multipliers 66 by 90° (Π/2) before being applied to the cosine correlators 76, 80 and 84.

The correlator circuits may be of the type known in the art which multiply and integrate the signals applied thereto. The multiplier may be a diode multiplier, and the integrator may be an RC integrating circuit which follows the multiplier. This integrator is reset, as by discharging the capacitor thereof at the beginning of the symbol interval by means of the output pulse from the delay circuit 72. To this end diodes may be connected across the capacitor and biased in the forward direction during the pulse from the delay circuit 72. A pair of diodes polarized in opposite directions may be used to insure that the capacitors in the correlators are discharged, notwithstanding the polarity to which they are charged during a symbol interval.

The output of the correlators corresponds to the sine and cosine components of information tones. A sine component being defined as the in-phase component of the received information tone with respect to the corresponding signal from circuit 66, and the cosine component as the quadrature-phase component of the received information tone with respect to the corresponding signal from circuit 66. For example, for the $S_{o_t}$ tone, the sine correlator 82 provides an output $$ys_{or}=\int_0^T s(t)\sin(2\Pi f_{o_r})dt$$

which, over the symbol interval from $O-T$, reduces to $A_o\cos\Phi_k$. Similarly the cosine correlator 84 determines the cosine component of the phase angle of the tone $S_{o_t}$ by performing the correlation operation expressed in the following equation:

$$yc_{or}=\int_0^T s(t)\cos(2\Pi f_{o_r})dt$$

The cosine component $yc_{or}$ during the symbol interval equals $A_o$ sine $\Phi_k$. Similarly the correlators 78 and 80 determine the sine and cosine components of the phase angle $\Phi_{k-1}$ of the $S_{nt}$ tone and correlators 74 and 76 determine the sine and cosine components of the phase angle $\Phi_{k-2}$ of the $S_{mt}$ tone.

A plurality of sampler circuits 92, 94, 96, 98, 100 and 102 are provided for detecting the output of the correlator at the end of the correlation interval which corresponds to the symbol interval in the instant exemplary case. The samplers may be analog gate circuits which are enabled by the output pulse from the pulse generator 70. When enabled, these samplers provide signals to circuits which derive outputs corresponding to the sine and cosines of the phase difference angles between the information tones, i..e. $\Delta\Phi_k$ and $\Delta\Phi_{k-1}$.

Figure 4:
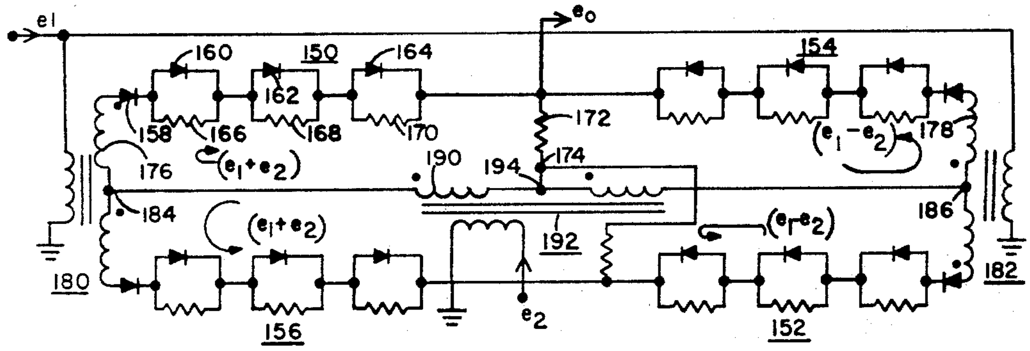
FIG. 4 is a schematic diagram of a multiplier circuit which embodies the invention and which may be used in the system of FIG. 3.

The cosine of the phase difference angle $\Delta\Phi_k$ is derived by means of a pair of multiplier circuits 104 and 106. A suitable multiplier circuit is illustrated in FIG. 4. The multiplier 104 is connected to the outputs of the samplers 98 and 102. The sampler 102 passes the signal $yc_{or}$ and the sampler 98 passes the signal $yc_{nr}$. $yc_{nr}$ can be represented by an equation similar to the one used to represent $yc_{or}$;

$$yc_{nr}=A_n \sin \Phi_{k-1}$$

The multiplier 104 therefore provides an output corresponding to the product of $yc_{or}$ and $yc_{nr}$. The other multiplier 106 is connected to the outputs of the samplers 96 and 100 which pass output signals $ys_{or}$ and $ys_{nr}$. $ys_{nr}$ can be represented by the following equation:

$$z_4=yc_{nr}\, yc_{or}+ys_{nr}\, ys_{or}$$

The multiplier 106 output corresponds to the products of $ys_{nr}$ and $ys_{or}$. The outputs of the multipliers 104 and 106 are added in an adder circuit 108 which may be linear (resistive) adder network to provide an output $z_4$. $z_4$ corresponds to the cosine of the phase difference between the $S_{nt}$ and $S_{ot}$ tones, i.e. $\Delta\Phi_k$. The following equations illustrate how the multipliers 104 and 106 and the adder 108 derive this output:

$$z_4=yc_{nr}yc_{or}+ys_{nr}ys_{or}$$

By use of a trigonometric identity it can be observed that $$z_4=\left(\frac{A_oA_nT^2}{4}\right)\cos \Delta\theta_k$$

since $\Delta\theta_k=\Delta\Phi_k$.

An output corresponding to the sine of the phase difference between the $S_{ot}$ and $S_{nt}$ tones is obtained by means of another pair of multiplier circuits 110 and 112, the outputs of which are applied to a subtracting circuit 116 which may be a linear resistive network including an amplifier which provides phase inversion of one of the input signals applied thereto so that by adding inputs to the subtracting circuit the output will correspond to the difference between the two inputs. The multiplier 110 is connected to the samplers 98 and 100 which provide the outputs $yc_{nr}$ and $ys_{or}$, respectively. The multiplier 112 is connected to the samplers 96 and 102 which provide the outputs $ys_{nr}$ and $yc_{or}$. The products of these signals at the outputs of the multiplier are subtracted by the subtracting circuit 116 to provide the output $z_3$. The multipliers 110 and 112 and the subtracting circuit 116 therefor implement the following equation:

$$z_3=yc_{or}\, ys_{nr}-ys_{or}\, yc_{nr}$$

By use of a trigonometric identify, $z_3$ reduces to the following equation:

$$z_3=\left(\frac{A_oA_nT^2}{4}\right)\sin \Delta\theta_k$$

since $\Delta\Phi_k=\Delta\Phi_k$.

Outputs $z_1$ and $z_2$ are obtained, which respectively correspond to the sine and cosines of the phase difference between the $s_n$ tones and the $s_m$ tones. To this end, multiplier circuits 120, 122, 124 and 126 are provided. The multipliers 120 and 122 provide outputs to an adder circuit 128. The adder circuit 128 provides the $z_2$ output. The $z_1$ output is provided by a subtracting circuit 130 which subtracts the multipliers 124 and 126. The circuits 120, 122 and 128 implement equations similar to those which provided the output $z_4$, whereas the multipliers 124 and 126 and the subtracting circuit 130 implement equations similar to those which provided the output $z_3$ in providing the output $z_1$.

The outputs $z_1$, $z_2$, $z_3$ and $z_4$ are converted into digital form to provide the bits $x_1$, $x_2$, $x_3$ and $x_4$ by means of triggerable flip flops 132, 134, 136 and 138. These flip flops are triggered by a negative-going signal to provide a "one" output and by a positive-going signal to provide a "zero" output. The triggering of the flip flops may be accomplished by diode steering networks therein of the type known in the art.

By referring to FIG. 2, it will be observed that the sines and cosines of the angle $\Delta\theta_k$ and $\Delta\theta_{k-1}$, as represented by the outputs $z_1$ through $z_4$, by their polarity dictate the values of the bits. For example, since $z_4$ corresponds to the cosine of the angle $\Delta\theta_k$, $x_4$ must be a binary "0" bit if $z_4$ is positive and a binary "1" bit if $z_4$ is negative; $x_4$ being the later of the pair of bits in accordance with the phase coding of these bits on transmission. Similarly $z_3$, which is a function of the sine of the phase difference angle, dictates that the bit $x_3$ is a binary "0" if $z_3$ is positive and a binary "1" if $z_3$ is negative.

A register 140 is provided for storing the bits transmitted during each symbol interval and for reading these bits out in serial to a data line. The register 140 may be a shift register to which shift pulses are provided at the rate $qf_{br}$ through an adjustable delay circuit 142. The register is enabled to read the output of the flip flops 132 to 138 by an enabling signal which is applied from the delay circuit 72. Since the pulse from the delay circuit 72 occurs after sampling, the flip flops 132 to 138 will have stored the bits transmitted during the immediately preceding symbol interval. Accordingly, the information may then be read into the register.

The data is shifted along and out of the register by the shift pulses of frequency $qf_{br}$. Accordingly, there will be storage in the register for the bits transmitted between successive symbol intervals. The adjustable delay circuit may be used to insure that shift pulses do not coincide with read-in pulses from the delay circuit 72.

Referring to FIG. 4, there is shown a multiplier circuit which may be used in any of the individual multipliers shown in FIG. 3. The circuit includes four diode dividers, 150, 152, 154 and 156. Each of these circuits is identical and includes a plurality of diodes 158, 160, 162 and 164, all but one of which are shunted by resistors 166, 168 and 170 which are desirably of equal resistance value. The diode voltage dividers 150 and 154, which are polarized to pass current in opposite directions are connected to each other. The diode dividers 156 and 153 which are similarly polarized in opposite directions are also connected to each other. An output resistor 172 which is center tapped at 174 is connected across the junctions of the connected divider circuits 150, 154 and 156, 152. The output windings 176 and 178 of a pair of input transformers 180 and 182, respectively, are connected across the unconnected ends of the divider circuits 150, 156 and 152, 154 respectively. It will be noted by the dots shown at the ends and the center taps 184 and 186 of the windings 176 and 178 respectively, that these windings are polarized in opposite directions with respect to each other.

The output winding 190 of another input transformer 192 is connected between the taps 184 and 186 of the output windings 176 and 178. The center tap 194 of the output winding 190, and the output resistor center tap 174 are connected together. The polarization of the transformers 192, 180 and 182, as may be observed by the dots, will be such as to create bucking and aiding relationships of the input voltages $e_1$ and $e_2$ during each half cycle thereof. For example, during the first half cycle, $e_1$ and $e_2$ will be aiding in the loop, including the diode divider 150, and will be in bucking relationship in the loop, including the divider 152. During the next half cycle the diode in the dividers 154 and 156 will conduct, the diodes in the dividers 150, 152 being biased in the reverse direction. The signals in the loop, including the divider 154, will then be in aiding relationship, while the signals in the loop, including the divider 156, will be in bucking relationship.

In operation, as the magnitude of the voltage across the dividers increases in the forward direction, the diode 158, which is not shunted by a resistor, will initially conduct the voltage across the remaining diodes 160, 162, and 164 being insufficient to cause these diodes to conduct by virtue of the resistors 166, 168 and 170. As the voltage increases the diodes 160, 162 and 164 progressively will have sufficient voltage thereacross to cause them to conduct. The resistors 166, 168 and 170 have values such that at least one of the diodes is operating in the square law region of its characteristic. Accordingly the characteristic of the entire diode divider with increasing voltage will approximate a square law characteristic. The multiplier circuit shown in FIG. 4 therefore operates over a wide input signal amplitude range, rather than being limited to very small signal amplitudes as is the case with available diode multiplier circuits. The circuit implements the following equation:

$$(e_1+e_2)^2-(e_1-e_2)^2=4e_1e_2=e_0$$

The output voltage $e_0$ may be derived across the output resistor 172. It will be apparent from FIG. 4 that the loop, including the dividers 150 and 152 provide output voltages which are present across the resistor 172 during one half cycle of the input signals, while the loop including the dividers 154 and 156 includes output voltages present across the resistor during the other half cycle of the input signals.

From the foregoing description it will be apparent that there has been provided an improved communication system especially adapted to include the digital data and improve circuits especially adapted for use therein. The communication system is adapted to transmit four binary bits during each symbol interval. It will be apparent that other systems embodying the invention may be adapted for transmitting many more bits during each symbol interval.

The symbol interval duration and the frequencies which are mentioned should also only be taken as illustrative. The symbol intervals may be varied, the frequencies may be varied, and additional tones may be used in accordance with the invention. Other variations and modifications within the spirit and scope of the invention will undoubtedly become apparent to those skilled in the art. Accordingly, the foregoing description should be taken as illustrative and not in any limiting sense.

What is claimed is:

1. A communication system in which information is transmitted in the form of a group of signals which represent said information in accordance with the phase relationship thereof, said system comprising:

(a) means for simultaneous comparison of different pairs of said signals, each signal being a different signal in said group with each other signal, the same signal being a member of no more than two of said pairs for deriving outputs representing the difference in phase between said signals in each of said different pairs, and (b) means responsive to said outputs for deriving said transmitted information.

2. A communication system in which a group of simultaneously transmitted signals each of a difference frequency represent information in accordance with the phas difference therebetween, said system comprising:

(a) means for comparing different pairs of said signals which are adjacent to each other in frequency each signal being a different signal in each of said successive groups with each other, the same signal being a member of no more than two of said pairs for deriving a plurality of outputs representing the phase difference between said adjacent frequency signals, and (b) means responsive to said outputs for deriving said information.

3. A communication system in which information is transmitted in successive groups during successive intervals of certain discrete duration each containing a plurality of items of information which are represented by a group of information signals each of a different frequency in accordance with the phase difference between said signals during each said intervals, said system comprising:

(a) means for comparing different pairs of said signals which are adjacent in frequency each signal being a different signal in each of said successive groups with each other, the same signal being a member of no more than two of said pairs during reception of each of said groups during intervals synchronous with said intervals of transmission for deriving outputs corresponding to the phase difference therebetween, and (b) means responsive to said outputs for deriving said items of information in each of said groups.

4. A communication system in which the bits of digital information are transmitted in accordance with the phase difference between tones of different frequency which are adjacent to each other in frequency in a group of said tones, said system comprising:

(a) means responsive to different pairs of said adjacent frequency tones each tone being a different tone in said group, the same signal being a member of no more than two of said pairs for deriving analog outputs which represent the phase difference between said tones, and (b) means responsive to the polarity of said outputs for deriving the bits of said transmitted digital information.

5. A communications system for transmitting information for a transmitting point to a receiving point, comprising:

(a) means at said transmitting point for generating and transmitting a plurality of tones of different frequency adjacent ones of which having phase relationships which vary in accordance with the information to be transmitted, (b) means at said receiving point for generating a plurality of tones corresponding to said plurality of transmitted tones, (c) means at said receiving point for receiving the transmitted tones which are generated at said transmitted point and comparing said received tones with said tones generated at said receiving point which corresponds thereto and with each other for deriving outputs which represent the phase relationship between different ones of said transmitted tone, and (d) means responsive to said outputs for deriving said transmitted information.

6. A communications system for transmitting information comprising:

(a) means at a transmitting point for generating a first tone, (b) means at said transmitting point responsive to the information to be transmitted for progressively phase modulating said tone in steps, (c) means at said transmitting point, responsive to said phase modulated tone, for providing a plurality of signals, the frequencies of which differ progressively from each other, each progressively phase modulated in accordance with a different one of said steps of progressive phase modulation of said tone, and (d) means at said receiving point for receiving said signals and deriving said information in accordance with the difference in phase between adjacent ones of said signals.

7. A communications system for transmitting a plurality of information items, comprising:

(a) means for generating a plurality of tones of progressively higher frequencies,
(b) a plurality of serially-connected phase shift means corresponding respectively to different ones of said information items,
(c) means for applying the lowest frequency one of said tones to said serially connected phase shift means so that the phase of said lowest frequency tone will be progressively shifted in accordance with said information,
(d) frequency translating means responsive to the outputs of different ones of said phase shift means and to said generated tones for providing a plurality of signals of progressively higher frequency progressively shifted in phase in accordance with said information, and
(e) means for transmitting said signals to a receiving point.

8. A communications system for transmitting in parallel a plurality of bits of digital information comprising:
(a) means for generating a first tone and a plurality of other tones of progressively higher frequency which differ from each other by a frequency which is an integral multiple of a certain frequency,
(b) a plurality of serially-connected phase shift means corresponding respectively to different ones of said bits and operated to present progressive phase shifts in accordance with the values of said bits,
(c) means for applying said first tone to said phase shift means so that the phase thereof will be progressively shifted in phase in accordance with said digital information,
(d) frequency translating means responsive to different ones of said plurality of tones and coupled to the outputs of different ones of said phase shift means for providing a plurality of signals progressively increasing in frequency steps,
(e) means for successively applying different groups of said bits to said phase shift means at intervals equal to the period of said certain frequency, and
(f) means for transmitting said signals continuously to a receiving point.

9. A communications system in which information is represented by a signal including a plurality of progressively phase shifted tones, said system comprising:
(a) means for generating a plurality of tones corresponding respectively to said phase shifted tones,
(b) means for correlating said corresponding tones with tones of like frequency for deriving outputs which are functions of the phase relationships therebetween,
(c) means operative upon said correlating means outputs corresponding to tones which are adjacent to each other in frequency for deriving outputs representing the phase difference between different pairs of said phase shifted tones, and
(d) means responsive to said last named outputs for deriving said information.

10. A communications system in which bits of digital information are transmitted in accordance with the phase difference between adjacent tones which differ from each other by progressive frequencies, said system comprising:
(a) means for generating a plurality of tones having the same frequencies as said transmitted tones,
(b) a plurality of correlating means each responsive to a different one of said generated tones and transmitted tones of like frequency for providing pairs of outputs which are sines and cosines of the phase difference between said like frequency generated and transmitted tones,
(c) means operating upon said different pairs of outputs corresponding to tones which are adjacent to each other in frequency for deriving outputs which are functions of the sines and cosines of the phase differences between said transmitted tones, and
(d) means responsive to said last named outputs for deriving said bits of digital information.

11. The invention as set forth in claim 10 wherein said means operative upon each said pair of sines and cosines, outputs comprises:
(a) a pair of multiplier circuits,
(b) means for applying the sine and cosine correlating means outputs corresponding to the tone of one of said frequencies individually to different ones of said multiplier circuits,
(c) means for applying the sine and cosine correlating means outputs corresponding to the tone of frequency adjacent to said one of said frequencies also individually to different ones of said multiplier circuits, and
(d) means for additively combining the outputs of said multiplier circuits.

12. A communications system for transmitting digital data from a transmitting point to a receiving point, said system comprising:
(a) a register for storing a plurality of bits of said data,
(b) means for generating a signal having a certain frequency, a first tone which is an integral multiple of said certain frequency and a plurality of tones of frequencies higher than said first tones which are spaced progressively in frequency in steps equal to said certain frequency,
(c) a plurality of phase shift means connected in tandem with each other and responsive respectively to different bits of said data when said bits are read out of said register for presenting progressive phase shifts to a signal passing through said phase shift means in accordance with the values of said bits,
(d) means for passing said first tone through said phase shift means for providing a plurality first tone outputs which are progressively shifted in phase and which correspond to said plurality of tones which are progressively spaced in frequency,
(e) frequency translating means responsive to corresponding ones of said first tone outputs and said plurality of tones for providing a plurality of signals carrying said data,
(f) means operated by said certain frequency signal for reading different groups of bits out of said register at intervals equal to the period of said certain frequency signal,
(g) means at said transmitting point for transmitting said data carrying signals to said receiving point,
(h) means at said receiving point responsive to certain of said transmitted signals for providing a signal of said certain frequency which is synchronized with said signal of certain frequency generated at said transmitting point,
(i) means at said receiving point for generating a plurality of tones corresponding in frequency to said transmitted signals,
(j) a plurality of correlator means for correlating said receiving point generated tones with said transmitted signals and deriving outputs which are sine and cosine functions of the phase differences between said transmitted signals and said tones of corresponding frequency,
(k) circuits for obtaining at intervals equal to the period of said signal of certain frequency, the products of different combinations of sine and cosine output function corresponding to said transmitted signals which are adjacent to each other in frequency,
(l) means for additively combining different pairs of said product outputs for deriving outputs which are functions of the phase difference between said adjacent frequency signals, and
(m) means fore deriving the value of the bits of said groups of bits at each said interval.

13. A communication system for transmitting information comprising (a) means at a transmitting point for generating a group of tones of different frequencies, each of which is shifted progressively in phase with reference to the phase of the tones adjacent thereto in frequency in accordance with the information to be transmitted, and (b) means at said receiving point for receiving said tones and deriving said information in accordance with the difference in phase between each of said tones and the tone immediately adjacent thereto in frequency.

14. The invention as set forth in claim 13 wherein said generating means includes means for shifting the phase of said tones during successive symbol transmission intervals whereby different information can be transmitted during each of said successive symbol transmission intervals, and wherein said means at said receiving point includes means for correlating said tones during symbol reception intervals synchronous with said symbol transmission intervals.

References Cited

UNITED STATES PATENTS

| | | | |
|---|---|---|---|
| 3,036,157 | 5/1962 | Franco et al. | 178—67 |
| 3,128,430 | 4/1964 | Richmond | 325—305 X |
| 3,290,440 | 12/1966 | Easton et al. | 178—67 |
| 3,294,907 | 12/1966 | Heald | 325—30 X |

ROBERT L. GRIFFIN, *Primary Examiner.*

WILLIAM S. FROMMER, *Assistant Examiner.*

U.S. Cl. X.R.

178—67, 50; 325—47, 56, 60, 163, 305, 320; 328—133